(12) United States Patent
Beall et al.

(10) Patent No.: US 6,344,078 B1
(45) Date of Patent: *Feb. 5, 2002

(54) BINDER SYSTEM FOR HONEYCOMB CERAMIC BODIES AND A METHOD FOR PRODUCING SAID HONEYCOMB BODIES

(75) Inventors: Douglas M. Beall, Painted Post, NY (US); Devi Chalasani, San Diego, CA (US); Ronald E. Johnson, Tioga, PA (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/605,296

(22) Filed: Jun. 28, 2000

Related U.S. Application Data (62) Division of application No. 09/321,013, filed on May 27, 1999, now Pat. No. 6,132,671.
(60) Provisional application No. 60/088,344, filed on Jun. 6, 1998.

(51) Int. Cl.$^7$ ..................... C04B 35/632; C04B 35/636
(52) U.S. Cl. ................. 106/285; 106/181.1; 106/182.1; 106/190.1; 106/191.1; 106/196.1; 106/311; 501/94; 501/109; 501/119; 264/630; 264/631; 264/664; 419/65
(58) Field of Search ........................... 106/181.1, 182.1, 106/190.1, 191.1, 196.1, 285, 311; 501/94, 109, 119; 264/630, 631, 669; 419/65

(56) References Cited

U.S. PATENT DOCUMENTS

| 4,680,154 A | | 7/1987 | Matsubara et al. | |
|---|---|---|---|---|
| 5,019,537 A | | 5/1991 | Kato et al. | |
| 5,344,799 A | | 9/1994 | Wu | |
| 5,538,681 A | | 7/1996 | Wu | |
| 5,568,652 A | | 10/1996 | Wu | |
| 5,678,165 A | | 10/1997 | Wu | |
| 6,080,345 A | * | 6/2000 | Chalasani et al. | 264/109 |
| 6,132,671 A | * | 10/2000 | Beall et al. | 264/630 |

FOREIGN PATENT DOCUMENTS

| EP | 0 650 944 | 3/1995 |
|---|---|---|
| EP | 0 714 867 | 6/1999 |
| JP | 04 341787 | 11/1992 |
| WO | 99 07652 | 2/1999 |
| WO | 99 10294 | 3/1999 |

* cited by examiner

Primary Examiner—David Brunsman
(74) Attorney, Agent, or Firm—Timothy M. Schaeberle; Kees van der Sterre

(57) ABSTRACT

A binder system for use in the formation of ceramic or other powder-formed greenware comprising a binder, a solvent for the binder, a surfactant, and a component that is non-solvent with respect to the binder and solvent. The non-solvent component exhibits a lower viscosity than the solvent when containing the binder and comprises at least a portion of an organic liquid having a 90% recovered distillation temperature of no greater than about 225° C. and more preferably less than 220° C. Also disclosed is a process of forming and shaping plasticized powder mixtures and a process for forming ceramic articles utilizing the binder system.

17 Claims, 3 Drawing Sheets

BINDER SYSTEM FOR HONEYCOMB CERAMIC BODIES AND A METHOD FOR PRODUCING SAID HONEYCOMB BODIES

This applications is a divisional of 09/321,013, U.S. Pat. No. 6,132,671, filed May 22, 1999 which claims the benefit of U.S. Provisional Application No. 60/088,344, filed Jun. 6, 1998, entitled "Binder System for Honeycomb Ceramic Bodies and a Method for Producing Said Honeycomb Bodies", by Beall et al.

BACKGROUND OF THE INVENTION

1. Field of the Invention

The present invention generally relates to a binder system for use in the field of forming ceramics or ceramic bodies and a method of producing ceramics or ceramic honeycomb bodies utilizing such a binder system. More particularly, the invention is concerned with a binder system that contains an organic liquid component and the use of that organic liquid-containing binder system in a method for producing ceramic honeycomb bodies

2. Discussion of the Related Art

Binders and binder systems useful for the manufacture of products from powdered materials, e.g., from particulate ceramic materials, must meet a number of requirements. For example, the binder and binder systems must be compatible with the ceramic material such that a flowable dispersion comprising a relatively high loading of the ceramic material in the binder may be provided. In addition, the "green" preform produced by shaping the dispersion of ceramic powder in the binder should have reasonable strength such that it can be handled.

For desirable "burnout" or removal of the binder, the binder should be removable from the shaped ceramic part without incurring distortion or breakage of the part. Furthermore, the binder-free preform should have at least a minimum level of strength, yet be sufficiently free of binder residues that defect-free consolidation is readily achievable.

The formulation of binders meeting these requirements is complex and a large number of different binder formulations have been disclosed in the prior art. Recently, cellulose ether binders have been favored for use in the forming articles of various shapes; i.e., honeycomb substrates. The mixtures are intimately blended and homogeneous and result in the green body having good integrity in size and shape, as well as uniform physical properties. In addition to the binders, these powder mixtures typically include certain organic additives, including for instance, surfactants, lubricants, and dispersants that function as processing aids to enhance wetting thereby producing a uniform batch.

Recently, there has been an increase in the demand for thinner walled, higher cell density cellular structures, complex shaped product, and products having a large frontal area. Thin walled and complex shaped products produced, utilizing the current binder technology, i.e., cellulose ether binders, are extremely difficult to handle without causing shape distortion because of the low strength of the "green" preform. One solution/recent trend in the extrusion technology, especially for multicellular honeycomb bodies, comprised of highly filled ceramic powder mixtures, is to extrude a stiffer body without causing a proportional increase in pressures. However, attempts to extrude stiffer ceramic batches with the current batch components; e.g., use of the aforementioned cellulose ether binder coupled with a lowering of the amount of water and/or including additives such as sodium tallowate or sodium stearate, have been largely unsuccessful because of the undesirable higher extrusion pressures and torques resulting from increased inorganic volume loading and increased abrasiveness of the batch.

Another attempted solution is to utilize rapid-setting techniques; i.e., solidifying the cell walls of the honeycomb quickly after forming, therefore ensuring that the dimension of the greenware will not be altered in subsequent cutting and handling steps. Prior rapid stiffening methods involve time-delayed stiffening using rapid set waxes as disclosed, for example in U.S. Pat. No. 5,568,652, and/or applying an external field such as an electrical, ultrasonic, or RF field at the die exit. Although these rapid-stiffening methods involve the extrusion of soft batches, which and historically, for highly filled ceramic mixtures, have lead to better extrusion quality, these methods have not been overly successful for thin walled cellular structures.

More recently, a solution has been disclosed in co-assigned U.S. Pat. App., Ser. No. 60/069,637 (Chalasani et al.) whereby the powder mixture, for forming honeycomb structures, includes powder materials, binder, solvent for the binder, surfactant, and a non-solvent (with respect to the binder, solvent and powder materials). This powder mixture is mixed, plasticized and shaped to form a green ceramic preform body having improved wet green strength and thus especially suitable for use in the processing of thin walled honeycomb structures. Furthermore, it is disclosed that the preferred aqueous binder system mixture includes water, cellulose ether and a hydrophobic non-solvent.

While this Chalasani reference provides significant advances in the capability of the art to form complex, thin-walled ceramic honeycomb bodies through extrusion, the inclusion of this non-solvent in the powder, e.g., light mineral oil, results in additional complications in the "burnout" or removal of the binder. Specifically, it is difficult to remove the binder components from the shaped ceramic part without incurring distortion or breakage of the part. Because of the reduced strength of the thin-wall ceramic honeycomb bodies and the corresponding increase in the dimensional changes during binder removal due to the exothermic nature of the removal of the oil, special considerations in the firing of the ceramic honeycomb must be undertaken to avoid cracking of the ceramic body. Specially designed kilns, apparatus for volatile removal, reduced oxygen containing atmospheres and increased, complicated firing cycles are among the numerous means that have been employed to reduce the differential shrinkage and high cracking frequency experienced during the firing of thin-walled ceramic honeycomb bodies which incorporate the aforementioned binder.

In light of the foregoing inconveniences experienced in the art, there remains a need to develop a binder system which permits a ceramic body to be formed and fired into a desired ceramic article without high differential shrinkage and incidences of cracking or defects and which can be quickly and easily removed from the ceramic body.

SUMMARY OF THE INVENTION

It is an therefore an object of the present invention to provide a binder system capable of use in forming ceramic or other inorganic honeycomb bodies which results in a sufficiently high wet strength of the formed green body with at least a portion of the binder system capable of being removed by evaporation during the drying process, thereby reducing the exotherms that can result in cracking and differential shrinkage during firing.

The above object of the invention may be achieved according to the invention that provides a binder system for use in the formation of ceramic or other powder-formed greenware. The essential components of the binder system of the invention include a binder, a solvent for the binder, a surfactant, and a component that is non-solvent with respect to any inorganic components, binder and solvent. The non-solvent component exhibits a lower viscosity than the solvent when containing the binder and comprises at least a portion of an organic liquid having a 90% recovered distillation temperature no greater than about 225° C. and more preferably less than about 220° C., as measured by, and defined in ASTM D86.

According to another embodiment of this invention, there is provided a moldable powder batch comprised of an inorganic powder component, consisting of a sinterable inorganic particulate material, and the above-mentioned binder system.

Preferred materials for use as the organic liquid in the binder system of the invention include, for example, straight and/or branched saturated and unsaturated hydrocarbons and/or cyclic hydrocarbons including aromatic or halogenated hydrocarbons exhibiting a carbon chain length having a distribution ranging from 8 to 14; most preferably, an isoparaffin and/or paraffin exhibiting a carbon chain length having a distribution ranging from 9 to 12.

According to another embodiment of the invention there is provided a method for forming and shaping plasticized powder mixtures comprising compounding an inorganic powder component consisting of a sinterable inorganic particulate material mixture and the above-mentioned binder system and thereafter plasticizing the components to form a plasticized mixture and then shaping the plasticized mixture to form a green body.

According to a final embodiment of the invention there is provided a method of making ceramic articles comprising the aforementioned steps of forming and shaping the inorganic powder and binder system composition and thereafter involving the additional step of heating this ceramic green body having the desired shape so as to remove the binder system and to fire the formed ceramic body thereby resulting in a fired ceramic body.

An advantageous feature of the binder system is that it is useful for producing cordierite honeycomb structures having thin walls and a large number of cells. Specifically, the resulting so-formed green body exhibits a high degree of stiffness necessary to avoid slump in ceramic honeycomb structures with very thin walls; those having a thickness less than 150 µm. An additional benefit of this invention is that firing cracks associated with previous binder systems are avoided, while still maintaining the extrusion benefits of the previous binder systems. Specifically the organic liquid is of a composition that allows for its removal during the drying portion of the heating through evaporation. As such, at least a portion of the binder system is removed prior to the firing portion of the heating without any exothermic intensity associated with previous binder systems.

BRIEF DESCRIPTION OF THE FIGURES

For a better understanding of the invention, reference is made to the attached drawings, wherein.

DETAILED DESCRIPTION OF THE INVENTION

According to the invention a binder system for use in the greenware processing steps of a subsequently fired ceramic or other inorganic body includes the following components, a binder, a solvent for the binder, a surfactant, and a component which is non-solvent with respect to at least the binder, inorganic and solvent components; i.e., immiscible with the binder and the solvent. The non-solvent exhibits a lower viscosity than the solvent when containing the binder and at least a portion of the non-solvent comprises an organic liquid having a 90% recovered distillation temperature of no greater than about 225° C. as defined by, and measured according to ASTM D86, more preferably less than 220° C.; hereinafter referred to as the organic liquid. It is contemplated that an embodiment of the invention described herein includes those binder systems in which the entire non-solvent is comprised of the organic liquid.

The functioning of the non-solvent, having at least a portion of an organic liquid in the instant invention, remains the same as that as disclosed in the Chalasani application. In short, the non-solvent replaces a portion of the solvent and does not contribute to plasticity, but provides the fluidity necessary for shaping while still allowing the batch to remain stiff. As such, the instant binder system achieves the same desired increase in the wet green strength over that achieved with conventional binders, without creating additional processing difficulties. In other words, the binder system of the instant invention allows for the extrusion of a stiff batch without adversely affecting performance such as the extrusion pressure, torque and flow characteristics.

The requirement that the organic liquid's 90% recovered distillation temperature point, as measured by the ASTM standard appropriate for the material being measured, ASTM D86, be no greater than about 225° C., ensures that substantially all of the organic liquid will evaporate in standard drying processes utilized to remove water, regardless of the partial pressure and the air flow conditions maintained during the drying process. The 90% recovered distillation temperature should, however be high enough to ensure that the organic liquid is not removed in the mixing, plasticizing and shaping greenware processing steps. Generally, acceptable organic liquids include hydrocarbons that exhibit a branched or straight carbon chain length having a distribution ranging from 8 to 14, more preferably 9–12, however cyclic hydrocarbons including aromatics may be used as long as the volatility is in an equivalent range as the above hydrocarbons with a carbon chain length having a distribution ranging from 8 to 14. Other desirable characteristics for the organic liquid include a misciblility with any other non-solvent components, and the ability to maintain its liquid nature during the forming/extrusion process. Lastly, the organic liquid non-solvent should exhibit a solubility parameter akin to that of the other non-solvents components, generally a solubility exhibiting the following Hansen parameters; as defined by Allan F. M. Burton in the "Handbook of Solubility Parameters and Other Cohesion Parameters", CRC Press, pp 95–111, $2^{nd}$ ed., 1991: (1) a dispersion parameter, $\delta_D$, ranging between about 12 to 20, preferably between about 14 to 19; (2) a polarity parameter, $\delta_P$, of less than or equal to 2, preferably less than or equal to 1; (3) a hydrogen bonding parameter, $\delta_H$, of less than or equal to 4, preferably less than or equal to 2; and (4) a total parameter, $\delta_T$, ranging between about 12 to 20, preferably between about 14 to 19.

The organic liquid, which forms at least a portion of the non-solvent component, may be selected from the group consisting branched and/or straight chain saturated and unsaturated hydrocarbons, cyclohydrocarbons. e.g., or naphthene-based hydrocarbons, as well as, cyclic hydrocarbons including aromatic and halogenated hydrocarbons and combinations thereof.

Acceptable saturated hydrocarbons which can be used in the present invention, include, for example, the saturated aliphatic hydrocarbons known as paraffins, isoparaffins or hydrogenated olefins, exhibiting a carbon chain length having a distribution ranging from 8 to 14. Specific examples include, odorless mineral spirits and linear alpha olefins exhibiting a carbon chain length having a distribution ranging from 10 to 14, as well as mixtures thereof. An aromatic hydrocarbon, which can be used in the present invention, includes, for example, alkyl benzene One examples of an acceptable alkyl benzenes includes diethyl benzene. An acceptable halogenated hydrocarbons for use in the present invention includes perchloroethylene.

Figure 1:
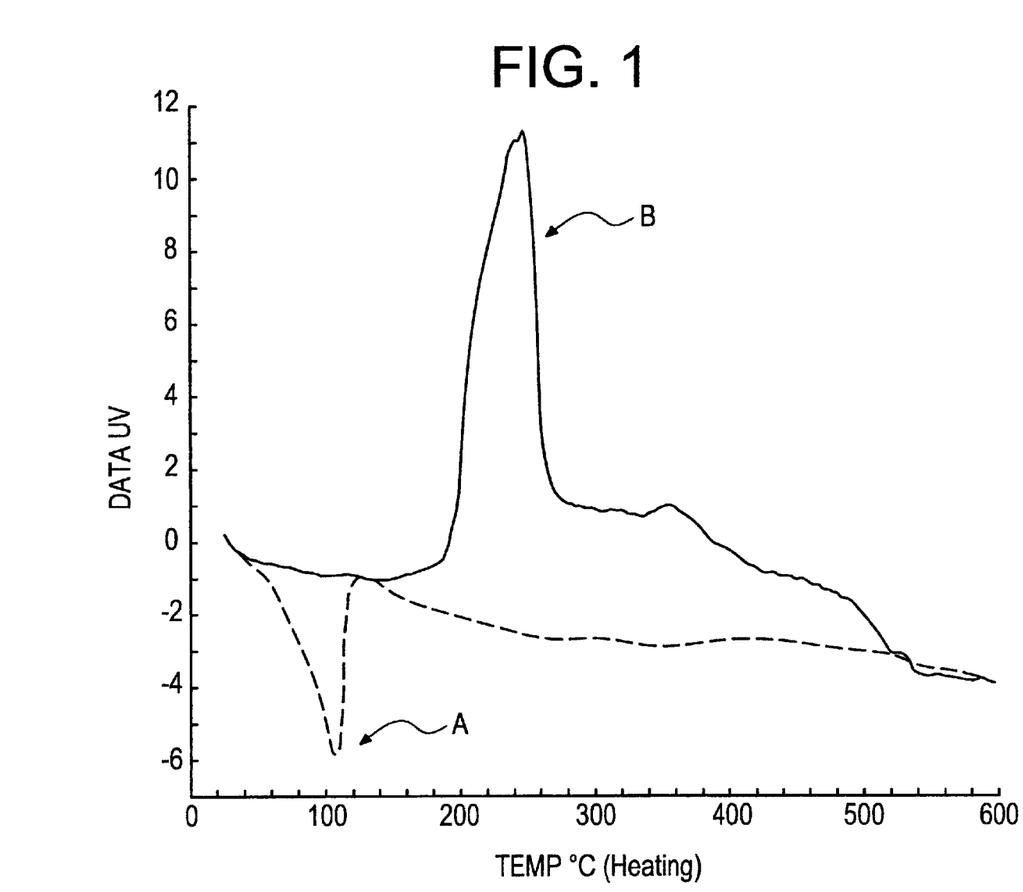
FIG. 1 is a graphical illustration comparing the endothermic nature of the removal of a representative organic liquid with the exothermic nature of a typical non-solvent having a 90% recovered distillation temperature of greater than 225° C.
Figure 2:
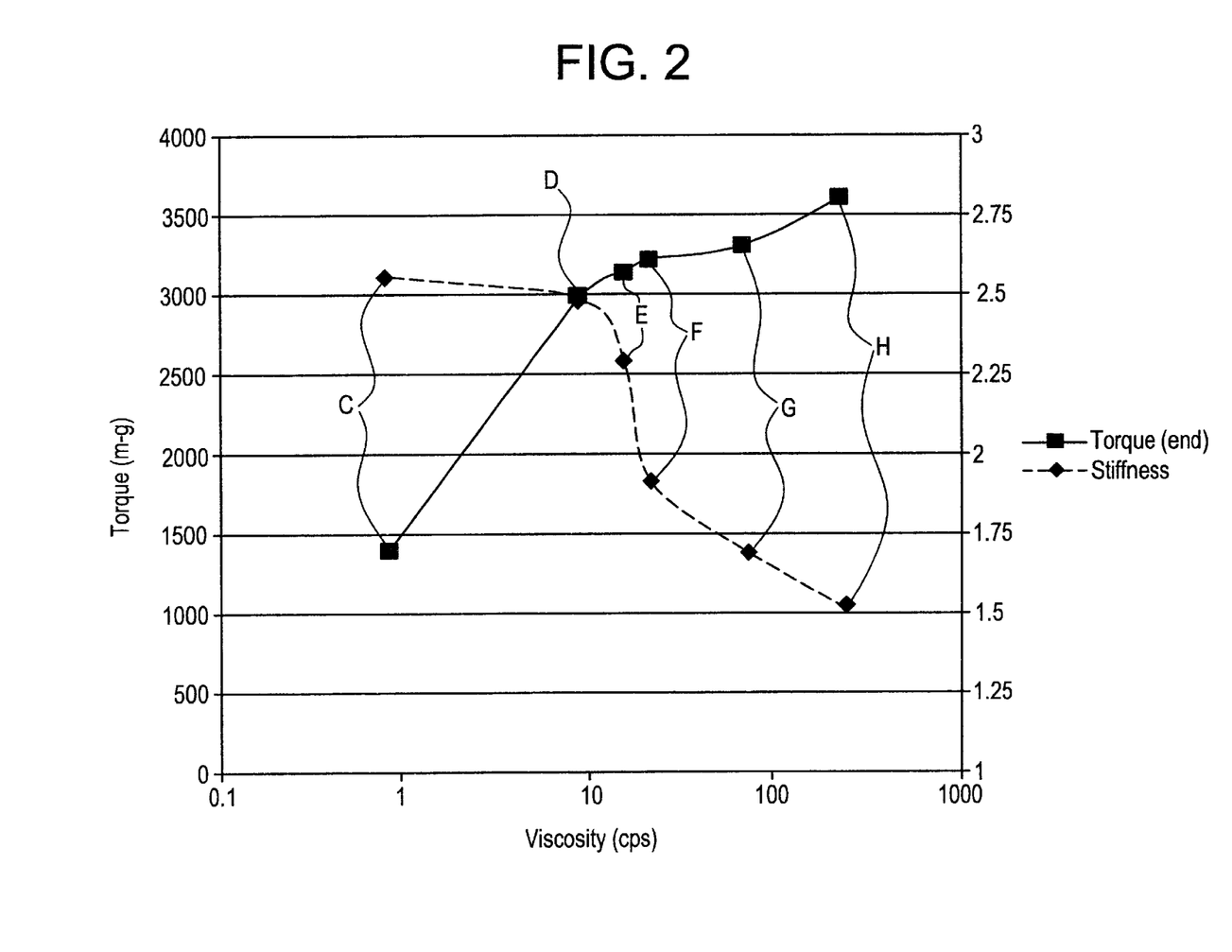
FIG. 2 is a graphical illustration of the reduction in torque and of the increased stiffness of a ceramic exhibited by a ceramic batch and green body incorporating the inventive binder system.

FIG. 1 illustrates a plot of the differential thermal analysis for a representative organic fluid exhibiting a carbon chain length having a distribution ranging from 8 to 14; plot designation A. FIG. 1 shows that the organic fluid exhibits an endotherm over the temperature range of 100–110° C., which is indicative of an evaporation process. This temperature range overlaps with the temperature range during which water is typically removed from the green body during drying. Plot A should be compared with Plot B of FIG. 1 which illustrates a typical non-solvent having a 90% recovered distillation temperature of greater than 225° C., as disclosed in the aforementioned Chalasani application, having a typical exotherm which occurs with the burnout of this typically, oil-based non-solvent. As such, the use of a binder system incorporating at least a portion of this organic fluid as the non-solvent is superior to any of the conventional systems, including those disclosed in the aforementioned reference, in that this inventive binder system provides the benefit that at least a portion of the organics in the binder system, the organic liquid can be removed by evaporation (through the drying process) prior to the actual firing process. This removal of the organic liquid portion of the organic binder will reduce the exotherm experienced by a green body during the firing and will likely lead to reduced cracking during firing of honeycomb ceramic or other inorganic substrate bodies.

The preferred binders used in this invention are aqueous based, that is, capable of hydrogen bonding with polar solvents. Acceptable binders for use in the present invention, are methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, and mixtures thereof Methylcellulose and/or methylcellulose derivatives are especially suited as organic binders in the practice of the present invention with methylcellulose, hydroxypropyl methylcellulose, or combinations of these being preferred. Preferred sources of cellulose ethers are Methocel A4M, F4M, F240, and K75M cellulose products from Dow Chemical Co. Methocel A4M cellulose is a methylcellulose. Methocel F4M, F240, and K75M cellulose products are hydroxypropyl methylcellulose.

The preferred cellulose ether binders can be combined with an aqueous co-binder component, including for example, PVOH or polyethylene oxide.

The properties of preferred cellulose ether binders such as methylcellulose are water retention, water solubility, surface activity or wetting ability, thickening of the mixture, providing wet and dry green strength to the green bodies, thermal gelation and hydrophobic association in an aqueous environment. Cellulose ether binders that promote hydrophobic association with the non-solvent and hydrogen-bonding interaction with the solvent are desirable. Examples of substituent groups that provide hydrophobic association with the non-solvent are methoxy, propoxy, and butoxy groups. These substituents which provide the hydrophobic association also contribute to the gel strength of the binder. The substituent groups that maximize the hydrogen bonding interaction with polar solvents e.g. water, are hydroxypropyl and hydroxyethyl groups, and to a smaller extent hydroxybutyl groups. This combination of properties enables binders to be at the interface between the solvent and non-solvent.

Acceptable solvents for use in the inventive binder system should be aqueous-based and provide hydration of the binder component and the inorganic particulate component. Particularly preferred, as the solvent, is water or water-miscible solvents.

Acceptable "non-organic liquid" non-solvents for use in the instant binder system include, for example hydrocarbons, silicones, fluorine compounds, phosphate esters, esters, liquid $CO_2$, supercritical fluids e.g., supercritical $CO_2$, and hot water at a temperature above the thermal gelation temperature for a given cellulose ether, and combinations of these. When hot water is used as a non-solvent, it is in combination with at least one other non-solvent component.

Specific examples of acceptable "non-organic liquid" non-solvents include, for example, light mineral oil, corn oil, high molecular weight polybutenes, polyol esters, a blend of light mineral oil and wax emulsion, a blend of paraffin wax in corn oil, and combinations of these. Particularly preferred "non-organic liquid" non-solvents include polyalphyl olefins, C14–C24 light mineral oils and alpha olefins.

Acceptable surfactants for use in the inventive binder system include, for example, C8–C22 fatty acids and/or their derivatives, C8–C22 fatty esters, C8–C22 fatty alcohols, stearic, lauric, linoleic, palmitoleic acids, stearic acid in combination with ammonium lauryl sulfate, with stearic lauric and oleic being particularly preferred.

In a preferred embodiment, the binder system of the instant invention comprises, assuming 100 parts binder, about 15 to 30 parts non-solvent with the organic liquid component comprising at least 1 part of the non-solvent, about 0.5 to 10 parts surfactant, about 2 to 20 parts binder, and about 50 to 75 parts solvent. In a more preferred embodiment, the binder system comprises about 5 to 10 parts non-solvent with the organic liquid component comprising at least 1 part of the non-solvent, about 1 to 5 parts surfactant, about 5 to 15 parts binder, and about 60 to 70 parts solvent.

A particularly preferred binder system embodiment comprises a binder component comprising a cellulose ether selected from the group consisting of methylcellulose, methylcellulose derivatives, and combinations thereof, an organic liquid component comprising an isoparaffin and/or paraffin comprising a carbon chain length having a distribution ranging from 9 to 12, a non-organic liquid non-solvent component comprising a polyalpha olefin, and a surfactant is selected from the group consisting of stearic acid, ammonium lauryl sulfate, lauric acid, oleic acid, palmitic acid and combinations thereof and a solvent comprising water.

The present invention is not restricted to ceramic batch formulations but has general application to powder forming processes; i.e., to the forming of products or preforms for products from essentially any particulate sinterable inorganic material which is available in or convertible to a finely divided form. Powder formed materials for which this invention is suitable include particulate ceramics, including crystalline ceramic materials, glasses in particulate form, and crystallizable glasses (glass-ceramics).

By ceramic, glass ceramic and glass ceramic powders what is meant are those materials as well as their pre-fired precursors. By combinations is meant physical or chemical combinations, e.g., mixtures or composites. Examples of these powder materials are cordierite, mullite, clay, talc, zircon, zirconia, spinel, aluminas and their precursors, silicas and their precursors, silicates, aluminates, lithium aluminosilicates, alumina silica, feldspar, titania, fused silica, nitrides, carbides, borides, e.g., silicon carbide, silicon nitride, soda lime, aluminosilicate, borosilicate, soda barium borosilicate or mixtures of these, as well as others.

Although the binder system offers substantial advantages in conventional inorganic forming processes it provides unique processing advantages for ceramic materials, especially those that yield cordierite, mullite, or mixtures of these on firing, some examples of such mixtures being about 2% to about 60% mullite, and about 30% to about 97% cordierite, with allowance for other phases, typically up to about 10% by weight. Some ceramic batch material compositions for forming cordierite that are especially suited to the practice of the present invention are those disclosed in U.S. Pat. No. 3,885,977 which is herein incorporated by reference as filed.

A particularly preferred ceramic material and one which ultimately forms cordierite upon firing is as follows, in parts by weight, assuming 100 parts inorganics: about 33 to about 41, and most preferably about 34 to about 40 parts of aluminum oxide, about 46 to about 53 and most preferably about 48 to about 52 parts of silica, and about 11 to about 17 and most preferably about 12 to about 16 parts magnesium oxide.

In the practice of the present invention, a moldable powder batch composition comprising a binder system and an inorganic powder component consisting of a sinterable inorganic particulate material, e.g., a ceramic powder material, can be prepared by using the components in any desired amounts selected.

In a preferred embodiment, the composition comprises 100 parts by weight of the inorganic powder, about 2 to 50 parts by weight of the non-solvent component with the organic liquid component comprising at least 1 part by weight, about 0.2 to 10 parts by weight of the surfactant component, about 2 to 10 parts by weight of the binder component, and about 6 to 50 parts by weight of the solvent component.

In a particularly preferred embodiment, the composition comprises 100 parts by weight of the inorganic powder, about 5 to 10 parts by weight of the non-solvent, about 0.2 to 2 parts by weight of the surfactant component, about 2.5 to 5 parts by weight of the binder component, and about 8 to 25 parts by weight of the solvent component.

The individual components of the binder system are mixed with a mass of the inorganic powder material, e.g., the ceramic powder material, in a suitable known manner, to prepare an intimate mixture of the ceramic material and the binder system. For example, all components of the binder system may be previously mixed with each other, and the mixture is added to the ceramic powder material. In this case, the entire portion of the binder system may be added at one time, or divided portions of the binder system may be added one after another at suitable intervals. Alternatively, the components of binder system may be added to the ceramic material one after another, or each previously prepared mixture of two or more components of the binder system may be added to the ceramic powder material. Further, the binder system may be first mixed with a portion of the ceramic powder material. In this case, the remaining portion of the ceramic powder is subsequently added to the prepared mixture. In any case, the binder system must be uniformly mixed with the ceramic powder material in a predetermined portion. Uniform mixing of the binder system and the ceramic powder material may be accomplished in a known kneading process.

Particularly, in the case of batches for ceramic products, the batch formation takes place in two stages prior to the shaping step. In the first stage or wetting stage of batch formation, the inorganic powder particles, surfactant, and the binder component are dry mixed followed by addition of the solvent such as in a Littleford mixer. The solvent is added in an amount that is less than is needed to plasticize the batch. With water as the solvent, the water hydrates the binder and the powder particles. The non-solvent is then added to the mix to wet out the binder and powder particles. The non-solvent typically has lower surface tension than water. As a result, it wets out the particles much more readily than the solvent. At this stage, the powder particles are coated and dispersed by the surfactant, solvent, and non-solvent.

In a preferred embodiment, the plasticization takes place in the second stage. In this stage the wet mix from the first stage is sheared in any suitable mixer in which the batch will be plasticized, such as for example in a twin-screw extruder/mixer, auger mixer, muller mixer, or double arm mixer, etc.

The resulting stiff batch is then shaped into a green body by any known method for shaping plasticized mixtures, such as e.g. extrusion, injection molding, slip casting, centrifugal casting, pressure casting, dry pressing, etc. The invention is best suited for extrusion through a die.

The extrusion operation either vertical or horizontal, can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The prepared ceramic green body is then fired at a selected temperature under suitable atmosphere and for a time dependent upon the composition, size and geometry so as to result in a fired body of the desired ceramic. For example, for a composition which is primarily for forming cordierite, the temperatures typically range from about 1300 to about 1450° C. with the holding times at these temperatures ranging from about 1 hour to 8 hours. Firing times and temperatures depend upon factors such as kinds and amounts of materials and the type of equipment utilized but typical total firing times range between about 20 to 80 hours.

The benefits resulting from the use of the inventive binder system are similar to those described in the aforementioned copending, co-assigned application detailing the use a non-solvent in the forming and shaping of ceramic green bodies. Specifically, those advantages include: (1) shaping, e.g. extrusion can be done at significantly lower temperatures, approximately at least about 25% lower, than was achieved by conventional binder systems; (2) lower temperature processing and thus lower mixing torques, which in turn enables extrusion at higher feed rates, (at least 2 times, and generally about 2–2.5 times higher) than those enable by conventional binder systems, while still maintaining product quality; (3) processing involving cellulose ether binders utilizing water as the solvent which produce higher gel strengths at higher throughputs and lowered heating rates of the ceramic batch mixture when compared to conventional batches where the higher throughput capability could not be achieved without drying blisters during dielectric drying as a result of lower gel strength; (4) extrusion process benefits of cell orthogonality at the perimeter of the shaped body, as well as a smooth skin; and, (5) good retention of shape after exiting the die, and specifically, in the case of multicellular structures, an improvement of the cell orthogonality at the perimeter of the part closer to the skin.

As described above, this method exhibits many of the same advantages, e.g., increased wet strength and increased extrusion speeds, of the aforementioned non-solvent containing binder system disclosed in the copending application, however, as described above, inherent in the use of these typically oil based non-solvents and other conventional binder systems is that during firing, large exotherms associated with non-solvent burnout have resulted in differential shrinkage and cracking. The instant binder system overcomes this shortcoming of the previous binders by incorporating into the binder system an additional non-solvent component, i.e., the organic liquid having a 90% recovered distillation temperature no greater than about 225 and, preferably less than 220° C. The main benefits the instant binder system exhibits over the previous binders include the following: (1) the removal of at least a portion of the binder system, the organic liquid fluid, during drying, as opposed to complete removal in the firing process, which reduces the occurrence of cracking or defects during firing and thus permits the easy formation of fired bodies; (2) the use of the organic liquid either alone or in combination with other non-solvents, e.g., polyalpha olefins, lowers the amount of fluid/binder that needs to be removed during firing; (3) the low viscosity of the organic liquid akin to that of water and lowered surface tension in certain compositions, i.e., the use of appropriate surfactants, lowers the mixing torques during extrusion, and exhibits minimal deformation/maximum stiffness enhancement; (4) the dimensional changes exhibited during firing by bodies incorporating the inventive binder system resemble those of a green body with no oil-based fluid; and (5) the instant binder system can be easily removed at a comparatively higher rate and accordingly allows for an increased productivity of fired bodies.

The instant invention is thus suitably applied to the fabrication of complicated formed bodies, especially ceramic, that are usually formed by extrusion, and to the manufacture of the corresponding fired bodies such as multicellular ceramic honeycomb structures having a high cell density and exhibiting thin cell wall dimensions.

EXAMPLES

To further illustrate the principles of the invention of the present invention, there will be described several examples of the binder system according to the invention. However, it is to be understood that the examples are given for illustrative purpose only, and the invention is not limited thereto, but various modifications and changes may be made in the invention, without departing from the spirit of the invention.

EXAMPLES 1–6

An inorganic powder batch mixture suitable for the formation of a cordierite ceramic body was prepared by combining and mixing together the components reported in TABLE I, as listed in parts by weight. Then, an amount of each of the 6 binder systems (5 comparison, 1 inventive), varied according to TABLE II, were added to the 6 portions of the powder batch to form 6 different plasticized ceramic batch mixtures as reported in TABLE II; the batches being mixed and plasticized utilizing a Brabender mixer. Compositions 1–6 of TABLE II comprised of 100 parts by weight of the inorganic powder batch mixture and an amount, in parts by weight, of the binder systems. TABLE III reports the non-solvent components utilized in the Examples; designations C–H. TABLE III lists the carbon chain distribution and the 90% recovered distillation temperature for each of the materials used as the non-solvent.

Each of the plasticized mixtures/compositions was extruded through a capillary rheometer to form ribbons exhibiting a thickness of about 3.1 mm (⅛"). The conditions maintained during extrusion included an extrusion pressure of between 150–170 kg and an extrusion temperature of between 23–25° C.

TABLE I

| INORGANIC COMPONENT | PARTS BY WEIGHT |
| --- | --- |
| TALC | 40.79 |
| CLAY | 41.82 |
| ALUMINA YIELDING PRECURSOR | 15.40 |
| SILICA YIELDING PRECURSOR | 2.00 |

TABLE II

| | F240 METHOCEL | STEARIC ACID[1] | NON-SOLVENT TYPE[2] | AMOUNT | WATER | TORQUE (m-g) | STIFFNESS (kg-mm) |
| --- | --- | --- | --- | --- | --- | --- | --- |
| INVENTIVE COMP. 1 | 2.70 | 0.6 | A | 9.0 | 23.65 | 1384 | 2.56 |
| COMPARISON COMP. 2 | 2.70 | 0.6 | B | 9.0 | 24 | 3028 | 2.49 |
| COMPARISON COMP. 3 | 2.70 | 0.6 | C | 9.0 | 23.75 | 3161 | 2.28 |
| COMPARISON | 2.70 | 0.6 | D | 9.0 | 24 | 3236 | 1.92 |

TABLE II-continued

| | F240 METHOCEL | STEARIC ACID[1] | NON-SOLVENT TYPE[2] | AMOUNT | WATER | TORQUE (m-g) | STIFFNESS (kg-mm) |
|---|---|---|---|---|---|---|---|
| COMP. 4 COMPARISON COMP. 5 | 2.70 | 0.6 | E | 9.0 | 24.4 | 3329 | 1.70 |
| COMPARISON COMP. 6 | 2.70 | 0.6 | F | 9.0 | 24.4 | 3589 | 1.52 |

[1]INDUSTRENE 9018 STRAIGHT CHAIN STEARIC ACID
[2]SEE TABLE III

TABLE III

| OIL DESIGNATION | OIL TYPE | CARBON CHAIN DISTRIBUTION | 90%/95% RECOVERED DISTILLATION TEMPERATURE (° C.) |
|---|---|---|---|
| A | EXXON ODORLESS MINERAL SPIRIT | C9–C12 | 197 |
| B | OIL ASSOCIATES OA-60T | C15–C27 | 369 |
| C | OIL ASSOCIATES OA-372 | C18–C36 | 462 |
| D | OIL ASSOCIATES OA-90T | C18–C36 (2% C15–C16, 3.6% C17–C18, 20.9% C19–C20, 53% C21–C22, 18.7% C23–C24) | 432 |
| E | OIL ASSOCIATES OA-180T | C18–C36 | 476 |
| F | OIL ASSOCIATES OA-500T | C18–C36 | 563 |
| G | DURASYN 162 | 90% C20, 10% C30 | 230 |
| H | PENNZOIL PENRECO 2260 | 0.2% C11–C12, 4.6% C13–C14, 41.1% C15–C16, 51.8% C17–C18, 1.9% C19–C20, 0.5% C21–C22 | 300.6 |
| I | GULFTENE 12 | C12 | 215.4 |

The mixing torque of each of the compositions was measured while the mixtures were plasticized and mixed in the Brabender mixer, with the mixing torques reported in TABLE II expressed as an "End" torque. The end torque reported for each of the compositions are representative of the torque at steady state, and are usually correlated to the torque observed in a twin screw extrusion or single screw extrusion process.

The intrinsic material stiffness or wet green strength of the formed ribbons was measured by applying a load to a piston at a given velocity and measuring the deformation of the ribbon (Load/Deformation ((L/D) and the values obtained were reported in TABLE II. Higher l/d numbers correspond to higher stiffness An examination of the torque values reported in TABLE II reveal that the inventive composition, Comp. 1, including the organic liquid A, an odorless mineral spirit having a 90% recovered distillation temperature 197° C., as a component of the binder system, has a lower torque than all the comparative compositions, 2–6, all of which incorporate a binder system which contains oil-based non-solvents exhibiting a higher carbon chain (C15–C36) and 90% recovered distillation temperatures 369° C. or greater. Furthermore, TABLE II reveals that although the torque of Inventive Comp. 1 is reduced, this sample, contrary to what would be expected for compositions having reduced torque, possesses a decreased deformation/higher stiffness when compared to those comparison compositions having an organic liquid with higher carbon chain lengths and higher 90% recovered distillation temperatures. These two trends, reduced torque coupled with an increased stiffness, for the inventive organic liquid-containing compositions, are more clearly illustrated in FIGS. 1; Inventive Comp. 1 through Comparative Comp. 6 corresponding to designations A through F. Note that ribbon deformation, representative of the stiffness, is positioned on the right-X axis while the torque measure is positioned on the left Y-axis.

EXAMPLES 7–10

Four separate plasticized batch mixtures each comprising the inorganic mixture of TABLE IV were each mixed each with a different one of the four organic batch systems listed in TABLE V and extruded to form ceramic ribbons, in like manner as that for Compositions 1–6. Inventive Compositions, 7 and 9, incorporate an inventive binder system having 2 parts by weight of an odorless mineral spirit, while the Comparative Compositions, 8 and 10, contain only a high carbon chain length, high 90% recovered distillation temperature oil-based non-solvent. Note that inventive composition 7 contains a non-solvent mixture of a polyalphyl olefin (DURASYN 162, Amoco Chemicals) having a chain length of C20 and C30 and an odorless mineral spirit (Exxon Inc.) having a chain length of C9–C12 and a 90% recovered distillation temperature of 197° C.

The four compositions were tested in the same manner as Compositions 1–6 and the torque and stiffness data are reported in TABLE V. In addition, the Peak torque was measured and reported for these compositions; the peak torque being a measure of the ease of wetting of the powders or the initial torque during mixing. The Inventive Comp. 7 and 9, both containing the odorless mineral spirit exhibiting a C9–C12 chain length and 90% recovered distillation temperature of 197° C., exhibited both a comparable torque and material stiffness when compared to the counterpart comparative compositions. As such, it is clear that the inventive batch system is superior to the conventional systems, given the fact the binder system exhibits similar forming and strength properties yet provides the benefit that at least a portion of the organics in the binder system, the odorless mineral spirit, can be removed by evaporation (through the drying process) prior to the actual firing process. This removal of a portion of the organic binder will reduce the exotherm experienced by the green body during the firing and will likely lead to reduced cracking during firing of honeycomb ceramic substrate bodies.

TABLE IV

Figure 3:
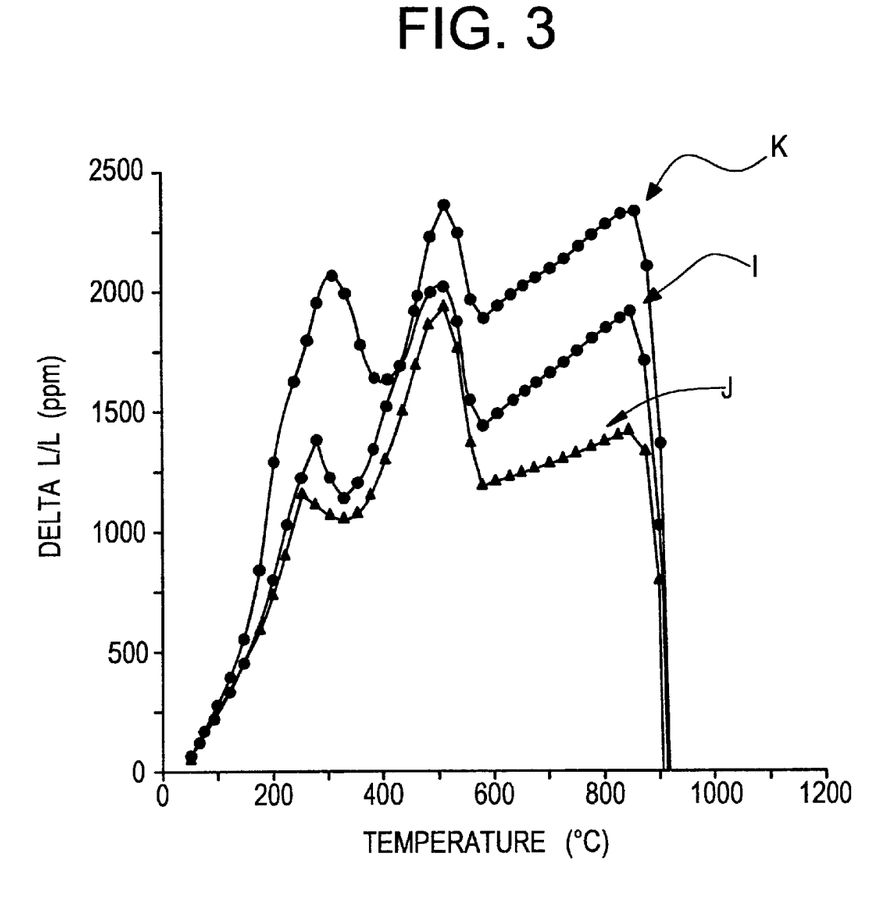
FIG. 3 is a graphical illustration showing the difference in dimensional changes between a ceramic body incorporating the inventive binder system when compared to ceramic bodies incorporating conventional binder systems.

| INORGANIC RAW MATERIAL | PARTS BY WEIGHT |
|---|---|
| TALC | 40.67 |
| CLAY | 26.82 |
| ALUMINA YIELDING PRECURSOR | 22.30 |
| SILICA YIELDING PRECURSOR | 10.22 | and subjected to a dilatometer test that measured dimensional change of the bars throughout the heating period. The dilatometer data for each of the rods, Compositions 11–13, designated I through K, respectively, is plotted in FIG. 3; i.e., dimensional changes during heating/firing as a function of temperature. An examination of FIG. 3 reveals that the dimensional changes for the green rods containing in the binder system a light mineral oil (Comp. 13), containing no non-solvent (Comp. 12) and containing odorless mineral spirit (Comp. 11) each exhibit two expansion zones (175–250° C.) and (400–500° C.) followed by two shrinkage zones (after 250 and 500° C.). Additionally, FIG. 3 reveals that the expansion of the Comp. 11 containing the inventive binder system resembles that of the standard green body incorporating no non-solvent in the system. This is in contrast to the system containing light mineral oil that shows significantly higher dimensional changes likely to cause cracking in a honeycomb substrate body.

TABLE V

| | F240 METHOCEL | STEARIC ACID[1] | NON-SOLVENT TYPE[2]/AMOUNT | WATER | TORQUE (m-g) PEAK | END | STIFFNESS (kg-mm) |
|---|---|---|---|---|---|---|---|
| INVENTIVE COMP. 7 | 3.2 | 0.5 | A/2.0, H/5.0 | 19.5 | 2429 | 1242 | 3.56 |
| COMPARISON COMP. 8 | 3.2 | 0.5 | H/7.0 | 19.5 | 2767 | 1183 | 3.66 |
| INVENTIVE COMP. 9 | 3.2 | 0.4 | A/2.0, G/5.0 | 19.3 | 2440 | 1181 | 3.87 |
| COMPARISON COMP. 10 | 3.2 | 0.5 | G/7.0 | 19.8 | 2329 | 1131 | 3.44 |

[1]INDUSTRENE 9018 STRAIGHT CHAIN STEARIC ACID
[2]SEE TABLE III

TABLE VI

| | F240 METHOCEL | SODIUM TALLOWATE | STEARIC ACID[1] | NON-SOLVENT TYPE[2]/AMOUNT | WATER |
|---|---|---|---|---|---|
| INVENTIVE COMP. 11 | 2.7 | — | 0.6 | A/9.0 | 22.3 |
| COMPARISON COMP. 12 | 2.7 | 0.6 | — | NONE | 30.5 |
| INVENTIVE COMP. 13 | 2.7 | — | 0.6 | C/9.2 | 23.75 |

[1]INDUSTRENE 9018 STRAIGHT CHAIN STEARIC ACID
[2]SEE TABLE III

EXAMPLES 11–13

Utilizing the inorganic amounts of TABLE I, and the binder compositions of TABLE VI, three plasticized ceramic batches were mixed together in a manner as described for Compositions 1–6. Compositions 11–13 were extruded at an extrusion pressure and temperature sufficient to form green ceramic rods having a ¼" diameter and a length of 2". These rods were placed in an electric furnace and heated to 900° C.

EXAMPLES 14–16

Three separate plasticized batch mixtures each comprising the inorganic mixture of TABLE VII were each mixed each with a different one of the three organic batch systems listed in TABLE VIII and extruded to form ceramic ribbons, in like manner as that for Compositions 1–6. Inventive Compositions 14–16, incorporate an inventive binder system wherein the non-solvent comprises only an organic liquid, specifically 6 parts by weight of a synthetic organic liquid, Gulftene 12.

The three samples were tested in the same manner as Compositions 1–6 and the torque, both peak and end, and stiffness data are reported in TABLE VIII. The Inventive Compositions 14–16, all incorporating a synthetic liquid exhibiting a C12 chain length (GULFTENE 12,) and a 90% recovered distillation temperature of 215.4° C., exhibit comparable torque and material stiffness when compared to the counterpart comparative compositions detailed above in Tables II and V and. As such, these inventive compositions incorporating only a synthetic liquid with a carbon chain length of 12 and the aforementioned 90% recovered distillation temperature of 215.4° C. in the inventive batch system, are superior to the conventional systems, given the fact the binder system exhibits similar forming and strength properties yet, as before, provides the benefit that at least a portion of the organics in the binder system, the synthetic liquid, can be removed by evaporation (through the drying process) prior to the actual firing process. This removal of a synthetic liquid portion of the organic binder will reduce the exotherm experienced by the green body during the firing and will likely lead to reduced cracking during firing of honeycomb ceramic substrate bodies.

TABLE VII

| INORGANIC RAW MATERIAL | PARTS BY WEIGHT |
| --- | --- |
| TALC | 40.38 |
| CLAY | 24.53 |
| ALUMINA YIELDING PRECURSOR | 18.84 |
| SILICA YIELDING PRECURSOR | 6.25 |

TABLE VIII

| | F240 METHOCEL | STEARIC ACID[1] | SYNTHETIC NON-SOLVENT TYPE[2]/AMOUNT | WATER | TORQUE (m-g) PEAK | END | STIFFNESS (kg-mm) |
| --- | --- | --- | --- | --- | --- | --- | --- |
| INVENTIVE COMP. 14 | 3.2 | 0.5 | I/6.0 | 22.8 | 1574 | 1241 | 3.28 |
| INVENTIVE COMP. 15 | 3.2 | 0.5 | I/6.0 | 22.8 | 1862 | 1301 | 2.85 |
| INVENTIVE COMP. 16 | 3.2 | 0.4 | I/6.0 | 22.8 | 2205 | 1239 | 2.93 |

[1]INDUSTRENE E-120 STRAIGHT CHAIN STEARIC ACID
[2]SEE TABLE III FOR TYPE

We claim:

1. A binder system for use in the greenware processing steps of a subsequently fired ceramic body comprising:
a binder, a solvent for the binder, a surfactant, and a component which is non-solvent with respect to at least the binder and solvent and which exhibits a lower viscosity than the solvent when containing the binder, at least a portion of the non-solvent component comprising an organic liquid having a 90% recovered distillation temperature of no greater than about 225° C.

2. The binder system of claim 1 comprising an organic liquid having a 90% recovered distillation temperature less than about 220°.

3. The binder system of claim 1 comprising in parts by weight, assuming 100 parts inorganics, about 15 to 30 parts non-solvent with the organic liquid comprising at least 1 part of the non-solvent, about 0.5 to 10 parts surfactant, about 2 to 20 parts binder, and about 50 to 75 parts solvent.

4. The binder system of claim 1 comprising, in parts by weight, about 5 to 10 parts non-solvent with the organic liquid comprising at least 1 part of the non-solvent, about 1 to 5 parts surfactant, about 5 to 15 parts binder, and about 60 to 70 parts solvent.

5. The binder system of claim 1 wherein the organic liquid is selected from the group consisting branched and/or straight chain saturated and unsaturated hydrocarbons, and/or cyclic aromatic and halogenated hydrocarbons, and combinations thereof.

6. The binder system of claim 5 wherein the saturated hydrocarbon is either an isoparaffin and/or paraffin exhibiting a carbon chain length having a distribution range from 9 to 12 or a linear alpha olefin exhibiting a carbon chain length having a distribution range from 10 to 14 or mixtures thereof.

7. The binder system of claim 1 wherein the non solvent comprises, in addition to the organic liquid, components selected from the group consisting of polyalpha olefins, C14–C24 light mineral oils, and alpha olefins and combinations thereof.

8. The binder system of claim 1 wherein the binder comprises a cellulose ether selected from the group consisting of methylcellulose, methylcellulose derivatives, and combinations thereof, the non-solvent comprises a mixture of polyalpha olefin and an isoparaffin and/or paraffin exhibiting a carbon chain length having a distribution range from 9 to 12, the surfactant is selected from the group consisting of, stearic acid, ammonium lauryl sulfate, lauric acid, oleic acid, palmitic acid and combinations thereof and the solvent is water.

9. A moldable powder batch comprising an inorganic powder component and a binder system, the inorganic powder component consisting of a sinterable inorganic particulate material wherein:
the binder system comprises a binder, a solvent for the binder, a surfactant, and a component which is non-solvent with respect to at least the binder and solvent and which exhibits a lower viscosity than the solvent when containing the binder, at least a portion of the non-solvent comprising an organic liquid having a 90% recovered distillation temperature of no greater than about 225° C.

10. The moldable powder batch of claim 9 wherein the organic liquid exhibits a 90% recovered distillation temperature of less than about 220° C.

11. The moldable powder batch of claim 9 comprising 100 parts by weight of the inorganic powder, about 2 to 50 parts by weight of the non-solvent with the organic liquid comprising at least 1 part by weight, about 0.2 to 10 parts by weight of the surfactant, about 2 to 10pars by weight of the binder, and about 6 to 50 parts by weight of the solvent.

12. The moldable powder batch of claim 9 comprising 100 parts by weight of the inorganic powder, about 5 to 10 parts by weight of the non-solvent, about 0.2 to 2 parts by weight of the surfactant, about 2.5 to 5 parts by weight of the binder, and about 8 to 25 parts by weight of the solvent.

13. The moldable powder of claim 9 wherein the organic liquid is selected from the group consisting branched and/or straight chain saturated and unsaturated hydrocarbons, and/or cyclic hydrocarbons including aromatic and halogenated hydrocarbons, and combinations thereof.

14. The moldable powder of claim 13 wherein the saturated hydrocarbon is either an isoparaffin and/or paraffin exhibiting a carbon chain length having a distribution range from 9 to 12 or a linear alpha olefin exhibiting a carbon chain length having a distribution range from 10 to 14 or mixtures thereof.

15. The moldable powder of claim 9 wherein the non-solvent comprises, in addition to the organic liquid, components selected from the group consisting of polyalpha olefins, C14–C24 light mineral oils, and alpha olefins, and combinations thereof.

16. The moldable powder of claim 9 wherein the binder comprises a cellulose ether selected from the group consisting of methylcellulose, methylcellulose derivatives, and combinations thereof, the non-solvent comprises a mixture of a polyalpha olefin and an isoparaffin and/or paraffin exhibiting a carbon chain length having a distribution range from 9 to 12, the surfactant is selected from the group consisting of, stearic acid, ammonium lauryl sulfate, lauric acid, oleic acid, palmitic acid and combinations thereof and the solvent is water.

17. The moldable powder of claim 9 wherein the inorganic powder component comprises cordierite-forming raw materials.

* * * * *

UNITED STATES PATENT AND TRADEMARK OFFICE
CERTIFICATE OF CORRECTION

PATENT NO. : 6,344,078 B1 Page 1 of 1
DATED : February 5, 2002
INVENTOR(S) : Beall et al.

It is certified that error appears in the above-identified patent and that said Letters Patent is hereby corrected as shown below:

Column 16,
Line 63, "2 to 10pars" should be -- 2 to 10 parts --.

Signed and Sealed this

Eleventh Day of June, 2002

Attest:

JAMES E. ROGAN
Attesting Officer    Director of the United States Patent and Trademark Office